(No Model.)

C. S. DRUMMOND.
SADDLE FOR BICYCLES.

No. 602,839. Patented Apr. 26, 1898.

*Fig. 2*   *Fig. 4*   *Fig. 3*

Witnesses:
L. T. Shaw
E. Ormant

Inventor
Charles S. Drummond
by E. M. Bentley
Atty.

UNITED STATES PATENT OFFICE.

CHARLES S. DRUMMOND, OF LONDON, ENGLAND, ASSIGNOR, BY MESNE ASSIGNMENTS, TO THE ESMOND CYCLE SADDLE COMPANY, OF NEW YORK, N. Y.

SADDLE FOR BICYCLES.

SPECIFICATION forming part of Letters Patent No. 602,839, dated April 26, 1898.

Application filed December 28, 1896. Serial No. 617,189. (No model.)

*To all whom it may concern:*

Be it known that I, CHARLES SINCLAIR DRUMMOND, a citizen of Great Britain, residing at London, England, have invented certain new and useful Improvements in Saddles for Bicycles and other Vehicles, of which the following is a specification, reference being made to the accompanying drawings, wherein—

Figure 1:
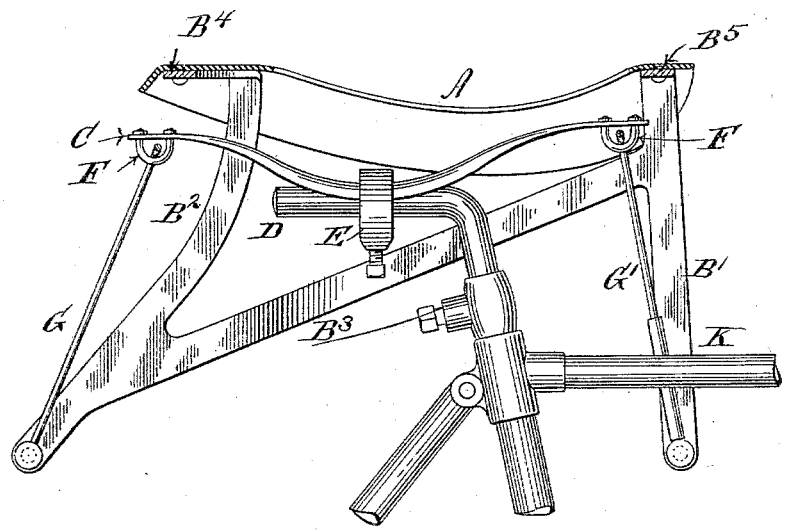
Figure 1:
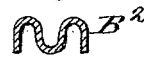
Figure 1:
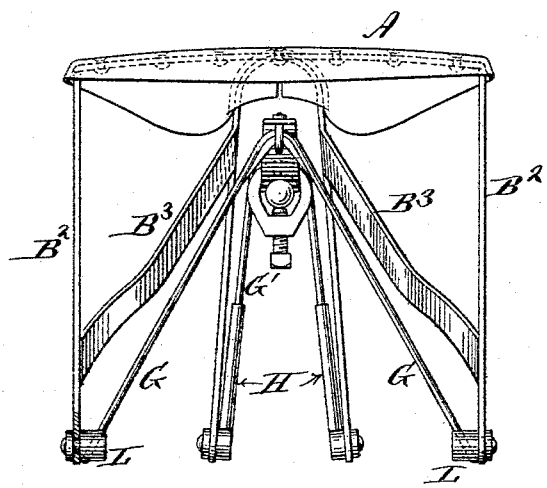
Figure 1:
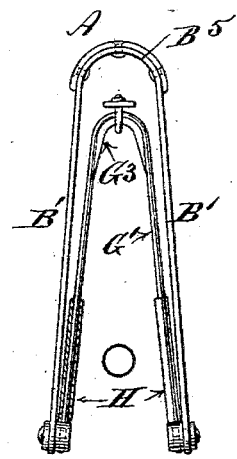

Figure 1 is a side elevation with half of the seat removed. Fig. 2 is a rear elevation. Fig. 3 shows the front end of the saddle with one roller in section. Fig. 4 shows a corrugated form for certain of the parts.

My invention resides in various improvements upon a saddle devised by Frederick C. Esmond and embodied in an application for patent, Serial No. 606,714, filed September 23, 1896.

The principle of the aforesaid saddle lies in the suspension of the seat by links capable of affording a longitudinal swinging movement to the saddle, both forward and backward, in such a manner that the weight and momentum of the rider tend constantly to maintain the seat in its normal central position. These links are four in number, two at each end of the saddle, and are jointed at their lower extremities to downward end projections from the saddle and at their upper ends to the supporting-standard on fixed horizontal axes.

My improvement consists in certain matters of detail by which the construction has been materially improved, and particularly in means for giving a lateral as well as a longitudinal swinging capacity to the seat, which capacity may be limited in extent by the engagement of the suspending parts with the top bar of the bicycle or vehicle frame on either side.

Referring to the drawings, A represents a seat of leather or other material and of any well-known shape, but preferably one in which there is a large central opening.

B is the main frame of the saddle, each half of which is, as shown in Fig. 1, somewhat Z-shaped, there being two upright parts B' and B², one at each end, which are connected by a diagonal brace-bar B³. The two Z-shaped halves are connected across at the top by transverse bars B⁴ and B⁵, and between these two latter bars is stretched the leather seat A. The rear bars B² are much farther apart than the front bars B', and the two diagonal brace-bars B³ extend not only downwardly and rearwardly from the front, but are extended outwardly and are thus spread apart or separated the right distance to engage at one end with the bars B² and at the other end with the bars B'.

C is a rigid supporting-bar attached removably to the horizontal saddle-post D by means of the binder E. On each end of the bar C is a loop F, in which the U-shaped links G and G' respectively engage. This engagement is such as to permit the links to swing about both a transverse and a longitudinal axis, the former movement in each case being about the axis of the individual joint, while the latter movement is about a single longitudinal axis formed by the axis of the two individual joints which are in alinement. These links are jointed at their lower ends to the extremities of the bars B' and B², respectively, and each branch of the link G' is surrounded by a friction-roller H, so that in event of either branch coming in contact with the top bar K of the frame by reason of the lateral movement of the saddle and as a limitation thereof the longitudinal swing of the saddle will not cause any chafing on the bar K or any impediment to the free movements of the seat.

It is to be noted that the lower ends of the link G extend diagonally through pins L, which in turn are jointed to the rods B². This avoids any bending strain on the small rods composing the two branches of the links. Each of the links G and G' is also provided with a curved wearing and strengthening piece G³ of harder material at the point where it passes through the loop F, and the bars B' and B² may be made of corrugated metal, as shown in Fig. 4.

The length of the links G and G' and the curvature rearwardly of the rods B² are such as to spread apart the lower ends of the links, so that as the saddle swings forward or backward from its normal central position it does not move on a horizontal line, but rises up at the leading end in whichever direction it moves, thereby tending to lift the weight of the rider and to oppose also his to-and-fro momentum. The result of this is that both the weight and momentum of the rider tend to oppose the swinging of the seat and to bring it back to its normal position. Consequently there is no occasion for springs to accomplish this result, nor is there any tendency for the rider to be thrown off the seat, because there is no retardation of the latter independent of the rider's movement. The capacity of the seat to swing slightly about the longitudinal horizontal axis accommodates it also to the movement of the rider's legs, which are alternately moved up and down in the act of pedaling, and also avoids any strain on the body of the rider in passing around curves. In short, the rider is enabled, as it were, to float with the saddle longitudinally and laterally, while the extent of such floating movement is restricted only by the weight and position of the rider in one direction and in the other by the engagement of the suspending parts with the frame. The vibration of the machine produced by inequalities in the road or any other cause cannot therefore be communicated to the seat and through it to the rider; but in every respect the vibration and jarring are taken up by the movement of the seat with relation to the machine and not, as in many saddles, by the movement of the rider with relation to the seat. This also is accomplished without the introduction of any springs, and the device appears to operate more satisfactorily when no springs of any kind are embodied in its construction.

What I claim as new, and desire to secure by Letters Patent, is—

1. The combination with a saddle or seat, of suspending-links therefor pivoted on transverse axes, so as to give a longitudinal swinging movement to the seat, and pivoted also on longitudinal axes, so as to give a transverse or lateral swinging movement, substantially as described.

2. The combination with a saddle or seat, of suspending-links therefor pivoted at one end on transverse axes to extensions from the seat, and at the other end, pivoted on both transverse and longitudinal axes to a supporting-standard, substantially as described.

3. The combination with a saddle or seat, of suspending-links therefor in front and rear, pivoted at their lower ends on a transverse axis to extensions from the seat and at their upper ends, pivoted on both a longitudinal and a transverse axis to a supporting-standard, the said longitudinal axis of the front and rear links being in alinement, whereby the seat itself has a capacity for movement about a single longitudinal axis and also a longitudinal movement constituting a combination of the movements of its respective ends due to the swinging of the links by which they are individually suspended, substantially as described.

4. The combination with a saddle or seat, of extensions therefrom projecting downwardly on either side of the saddle-post, and U-shaped links jointed at their lower ends to the said projections and at their upper ends, jointed to a supporting-standard on both transverse and longitudinal axes, substantially as described.

5. The combination with a saddle or seat, of two downwardly-extending bars at each end, those at the rear being separated more widely than those at the front and suspending-links, one for each end of the seat, having their lower ends spread apart a distance corresponding to the distance between the said bars at the corresponding end of the seat and jointed thereto on transverse axes, and at their upper ends supported on a common longitudinal horizontal line about which they are free to swing laterally, and also jointed at the same ends so as to swing about transverse axes passing through their respective points of support, substantially as described.

6. The combination with a saddle or seat and bars extending downwardly therefrom, of the U-shaped links G and G' jointed at their lower ends to the said bars and at their upper ends, engaging with loops F F so as to swing freely on both horizontal and transverse axes, and wearing-pieces $G^3$ interposed between said links and loops, substantially as described.

7. The combination with saddle or seat A, of front and rear extensions B' and $B^2$, the latter being separated a wider distance apart than the former, and diagonal brace-bars $B^3$ joining the upper part of B' with the lower part of $B^2$ and curved or spread apart a distance corresponding to the separation of the bars $B^2$ at the rear end and the bars B' at the front end of the saddle or seat, substantially as described.

In witness whereof I have hereunto set my hand, in the presence of two subscribing witnesses, this 26th day of December, 1896.

CHARLES S. DRUMMOND.

Witnesses:
L. T. SHAW,
E. ORMANT.